US008700909B2

(12) United States Patent
Griffin

(10) Patent No.: US 8,700,909 B2
(45) Date of Patent: Apr. 15, 2014

(54) REVOCATION OF A BIOMETRIC REFERENCE TEMPLATE

(75) Inventor: Phillip H. Griffin, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 417 days.

(21) Appl. No.: 12/713,364

(22) Filed: Feb. 26, 2010

(65) Prior Publication Data
US 2011/0213981 A1 Sep. 1, 2011

(51) Int. Cl.
*G06F 21/00* (2013.01)

(52) U.S. Cl.
USPC ............................................. 713/185; 726/5

(58) Field of Classification Search
None
See application file for complete search history.

(56) References Cited

U.S. PATENT DOCUMENTS

| 2002/0026582 | A1* | 2/2002 | Futamura et al. | 713/170 |
| 2006/0235729 | A1* | 10/2006 | Braithwaite et al. | 705/3 |
| 2008/0162943 | A1* | 7/2008 | Ali et al. | 713/185 |
| 2011/0140841 | A1* | 6/2011 | Bona et al. | 340/5.83 |
| 2011/0317882 | A1* | 12/2011 | Muazam | 382/117 |

OTHER PUBLICATIONS

N.K. Ratha et al., "Enhancing security and privacy in biometrics-based authentication systems," IBM Systems Journal. vol. 40. No. 3. (2001), p. 614-634.*
'Generating Cancelable Fingerprint Templates', by N.K. Ratha, J.H. Connelli, and R.M. Bolle of IBM Research (and Sharat Chikkerur) pp. 561-572 of the IEEE Transactions on Pattern Analysis and Machine Intelligence, vol. 29, No. 4, Apr. 2007.
'System, Method, and Program Product for Generating a Cancelable Biometric Reference Template on Demand', US Patent and Trademark Office U.S. Appl. No. 12/370,379, Feb. 12, 2009.
System, Method, and Program Product for Checking the Revocation Status of a Biometric Reference Template, US Patent and Trademark Office U.S. Appl. No. 12/370,334, Feb. 12, 2009.
ISO/IEC 9834-1:2005 | ITU-T Recommendation X.660 (2004), Information Technology—Open Systems Interconnection—Procedures for the operation of OSI Registration Authorities: General procedures and top arcs of the ASN.1 Object Identifier tree.
ISO/IEC 8824:2001 (All parts) | ITU-T Recommendation X.680-series (2000), Information Technology-Abstract Syntax Notation One (ASN.1).
ISO/IEC 9594-8 | ITU-T Recommendation X.509, Information technology—Open Systems Interconnection—The Directory: Public-key and attribute certificate frameworks.
IETF "RFC 2396: Uniform Resource Identifiers (URI): Generic Syntax", T. Berners-Lee, R. Fielding, L. Masinter, Aug. 1998 (See http://www.ietf.org/rfc/rfc2396.txt.).
ITU-Recommendation X.1141 Security Assertion Markup Language (SAML).
ITU-T Recommendation X.1142 XML Access Control Markup Language (XACML).
ANSI X9.73 Cryptographic Message Syntax (CMS).

* cited by examiner

*Primary Examiner* — Gilberto Barron, Jr.
*Assistant Examiner* — Abdulhakim Nobahar
(74) *Attorney, Agent, or Firm* — George R. McGuire; Blaine T. Bettinger; Bond Schoeneck & King, PLLC

(57) ABSTRACT

A system, method and program product for generating a biometric reference template revocation message on demand. The method includes generating, using a biometric reference template revocation engine, a biometric reference template revocation message and loading the biometric reference template revocation engine onto a secure portable device for generating on demand of the individual the biometric reference template revocation message.

17 Claims, 5 Drawing Sheets

REVOCATION OF A BIOMETRIC REFERENCE TEMPLATE

FIELD OF THE INVENTION

Embodiments of the present invention are directed to biometric technology and more specifically to a technique for revoking a biometric reference template.

BACKGROUND OF THE INVENTION

Biometrics are best defined as measurable physiological and/or behavioral characteristics that can be utilized to verify the identity of an individual. They include fingerprints, retinal and iris scans, hand geometry, voice patterns, facial features, and other characteristics. They are of interest in any area where it is important to verify the true identity of an individual. Initially, techniques using biometrics were employed primarily in specialized high security applications, however we are now seeing their use and proposed use in a much broader range of public situations.

Examples of public use-type situations include prison visitor systems, where visitors to inmates are subject to verification procedures in order that identities may not be swapped during the visit—a familiar occurrence among prisons worldwide; driver licenses, whereby some authorities found that drivers (particularly truck drivers) had multiple licenses or swapped licenses among themselves when crossing state lines or national borders; canteen administration, particularly on campus where subsidized meals are available to bona fide students, a system which was being heavily abused in some areas; and benefit payment systems, wherein several states have saved significant amounts of money by implementing biometric verification procedures, reducing the numbers of multiple claims made by an individual.

Biometric reference templates can be uniquely identified and associated with the identity of an individual. The biometric data component of a template is a constant that identifies an individual. Exposure of a reference template over time, when aggregated with other information, provides a footprint of activities that the individual participated in (such as, making a purchase in a store, clocking in and out of work, paying a highway toll) and the locations of that individual at various points in time (such as, when they were at a particular banking machine, toll booth, or store's check-out register).

Thus, a need exists to protect the privacy of individuals who wish to benefit from the use of biometrics, but who have concerns about personal privacy, or who do not wish to be easily monitored or tracked. It would be beneficial to provide a way to easily revoke biometric reference templates.

SUMMARY OF THE INVENTION

It is a primary object of an embodiment of the present invention to provide a method for revoking a biometric reference template generated for an individual by a biometric service provider, using a biometric reference template revocation engine.

In a further aspect, the method includes generating, on demand, a biometric reference template revocation message. The method includes injecting the biometric reference template revocation message created into a secure portable device issued to the individual and loading the biometric reference template revocation engine onto the secure portable device for generating on demand of the individual the biometric reference template revocation message.

According to another aspect of the method, the injecting step further includes the step of signing the biometric reference template revocation message to provide a signature thereon before injecting the biometric reference template revocation message into the secure portable device.

According to a further aspect of the method, the injecting step further includes the step of encrypting the signature on the biometric reference template revocation message before injecting the biometric reference template revocation message into the secure portable device.

According to yet another aspect of the method, the generating step further includes the step of requesting input of one or more authentication factors for generating the biometric reference template revocation message for the individual.

According to a further aspect, the method further includes storing the biometric reference template revocation message in a database.

According to yet another aspect of the method, the biometric reference template may include an ordinary biometric reference template or a cancelable biometric reference template According to a further aspect, the method further includes sending a signed biometric reference template revocation message to the biometric service provider to revoke the biometric reference template According to another embodiment, a system is provided for revoking a biometric reference template generated for an individual by a biometric service provider.

According to an aspect, the system includes a biometric reference template revocation engine for generating one or more biometric reference template revocation messages for a biometric reference template, and a secure portable device assigned to the individual for storing one or more of the biometric reference template revocation messages generated, wherein the individual dispenses a biometric reference template revocation message as needed to revoke a biometric reference template.

According to another aspect, the system further includes an authentication tool for authenticating identity of the individual seeking to generate a biometric reference template revocation message.

According to a still a further aspect, the system includes a database for storing the biometric reference template revocation message.

According to yet another aspect of the system, the biometric reference template revocation message is injected into the secure portable device and the biometric reference template revocation engine is loaded onto the secure portable device for generating the biometric reference template revocation message on demand.

According to another aspect, the system includes a biometric application for assigning a respective identifier to a respective biometric reference template for uniquely identifying the respective biometric reference template to be revoked.

According to a further aspect of the system, the one or more of the biometric reference template revocation messages are signed before being stored.

According to one more aspect of the system, the biometric application tracks an identity of an intended recipient for receiving the biometric reference template revocation messages.

According to a further embodiment, a computer program product is provided for revoking a biometric reference template generated for an individual by a biometric service provider.

According to one aspect, the computer program product includes a computer readable storage medium, first program instructions to generate, utilizing a biometric reference template revocation engine, a biometric reference template revocation message, and a central processing unit for executing the first program instructions, and wherein the first program instructions are recorded on the computer readable storage medium.

According to a further aspect, the computer program product includes second program instructions to store the a biometric reference template revocation message in a database, wherein the second program instructions are recorded on the computer readable storage medium.

According to yet another aspect of the computer program product, the first program instructions include instructions to inject the biometric reference template revocation message into a secure portable device issued to the individual and to load the biometric reference template revocation engine onto the secure portable device for generating on demand of the individual the biometric reference template revocation message.

According to a further aspect of the computer program product, the first program instructions include instructions to sign the biometric reference template revocation message before injecting the biometric reference template revocation message into a secure portable device to provide a signature on the biometric reference template revocation message.

According to yet another aspect of the computer program product, the first program instructions include instructions to encrypt the signature on the biometric reference template revocation message before injecting the biometric reference template revocation message into a secure portable device.

According to a further aspect of the computer program product, the first program instructions include instructions to request input of one or more authentication factors for generating the biometric reference template revocation message for the individual.

BRIEF DESCRIPTION OF THE DRAWING FIGURES

The present invention will be more fully understood and appreciated by reading the following Detailed Description in conjunction with the accompanying drawings, in which.

DETAILED DESCRIPTION OF THE INVENTION

Figure 1:
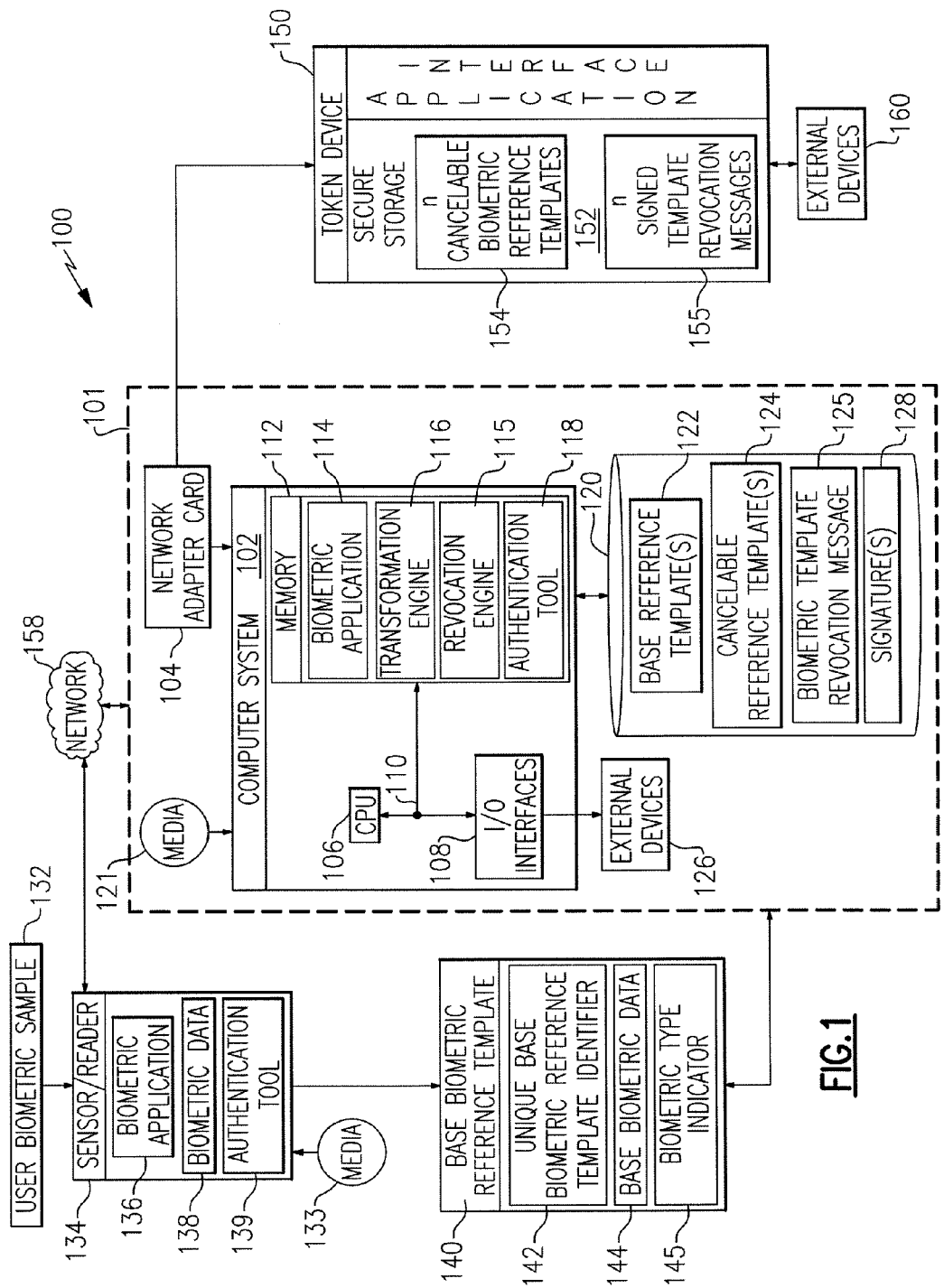
FIG. 1 is a block diagram depicting an embodiment of a computer infrastructure having a biometric reference template revocation message generation engine or tool deployed thereon for creating and injecting one or more signed template revocation messages onto a token device, in response to a request from a user or individual, in accordance with an embodiment of the present invention.

As will be appreciated, an embodiment of the present invention provides a computer infrastructure 100 having a computer system or server 102 for generating one or more template revocation messages using a biometric reference template revocation engine or tool 115 (referred to herein as "revocation engine") deployed thereon. Computer system 102 is intended to represent any type of computer system that is maintained in a secure environment, that is, for which access control is enforced (as represented by the dotted lines indicated by reference numeral 101). The computer system or server 102 is shown to include a CPU (Central Processing Unit) 106, a memory 112, a bus 110, and input/output (I/O) interfaces 108. Further, the server 102 is shown in communication with external I/O devices/resources 126 and database 120. In general, CPU 106 executes computer program code stored in memory 112, such as the biometric application 114 for processing biometric data contained in a biometric sample 132. In an embodiment, the biometric application 114 deployed on the computer system 102 is loaded into memory 112 of the computer system 102 from a computer readable storage medium or media (reference numeral 121) such as, a magnetic tape or disk, optical media, DVD, memory stick, semiconductor memory, etc. or downloaded from the server via a network adapter card (reference numeral 104) installed on the computer system 102.

It should be mentioned that the embodiments of the invention described herein may also be used with or for a cancelable biometric reference template, which system, method and computer program product are described in copending, commonly owned application Ser. No. 12/370,379, which is hereby incorporated by reference. Additionally, copending, commonly owned application Ser. No. 12/370,334, also hereby incorporated by reference, may also be used in conjunction with the embodiments described herein. For convenience sake, FIG. 1 is shown with the addition of cancelable biometric templates in infrastructure 100, and some of the embodiments herein will be described using the cancelable reference templates in addition to the base reference templates, although, as mentioned above, it is not necessary to include said cancelable templates and the embodiments may be used with solely base reference templates or both base reference templates and cancelable reference templates. Some or all of the embodiments described herein may incorporate the cancelable biometric reference template, which system, method and computer program product may or may not be included in the system, method and computer program product of the embodiments described herein. It is included in the description merely as an option.

Accordingly, the memory 112 is shown in FIG. 1 to include a biometric transformation engine 116 (also referred to herein simply as "transformation engine") for generating one or more biometric reference template revocation messages or cancelable biometric reference template revocation messages (referred to herein as "revocation messages") for a base biometric reference template (also referred to herein as simply "biometric reference template" or "reference template" or "base template" or "base reference template").

The biometric template revocation message(s) generated by the system using revocation engine 115 along with base reference templates 122 and cancelable biometric reference templates 124 generated by the system using the transformation engine 116 are stored in database 120 within the infrastructure 101. In an embodiment, each respective template revocation message 125 contains an identifier to the base reference template or cancelable biometric reference template it desires to revoke and each respective cancelable biometric reference template 124 contains the transformation of the base biometric data 144 into respective cancelable biometric data, as explained further herein below. In addition, the memory 112 has stored thereon an authentication tool 118 for authenticating signatures associated with a signed template revocation message and a base biometric reference template. In an embodiment, a base biometric reference template 140 is created using an individual's biometric sample 132. In an embodiment, the base biometric reference template 140 is stored with other base biometric reference templates 122 within a database 120 within the computer infrastructure 101. In particular, as shown in FIG. 1, a user or individual provides a biometric sample 132 using a biometric sensor or a biometric reader or scanning device 134 coupled to the computer infrastructure 101 via network 158. In an embodiment, the biometric sensor or reader or scanner 134 converts the scanned user biometric sample 132 to a digital form using an instance 136 of the biometric application 114 deployed on the computer system 102. In an embodiment, an instance 136 of the biometric application 114 deployed on the computer system 102 is loaded into the sensor or reader device 134 within the computer infrastructure 100 from a computer readable storage medium or media (reference numeral 133), such as, a magnetic tape or disk, optical media, DVD, memory stick, semiconductor memory, etc. or downloaded from the server via a network adapter card (reference numerals 104) installed on the computer system or server 102. In particular, the instance 136 of the biometric application 114 loaded into the biometric sensor or reader device 134 is used to process the biometric sample 132 collected from a person or an individual or user into base biometric data 138, which, in an embodiment, is stored within the biometric sensor or reader device 134. Further, the base biometric data 138 processed by the sensor or reader device 134 is used to create a base biometric reference template 140. Further, the sensor or reader device 134 uses an instance 139 of the authentication tool or program 118 for signing a revocation message that is created and for signing a biometric reference template that is created. Further, the authentication tool 139 is used to sign any attributes that are associated with and/or included in a base biometric reference template 140.

In an embodiment, the base biometric reference template 140 created is assigned a unique base biometric reference template identifier 142 (also referred to herein simply as "reference template identifier") for uniquely identifying the base biometric reference template 140 created using a person's biometric data 138 that is processed from the person's biometric sample 132. In an embodiment, the unique reference template identifier 142 is created in the form of an information object identifier (OID) as defined in ISO/IEC 8824 and ISO/IEC 9834, a universally unique identifier (UUID) as defined in ISO/IEC 9834-8, or a uniform resource identifier (URI) as defined in RFC 2396. Further, in an embodiment, the base biometric data 138 (also referred to herein simply as "biometric data") that is processed using a biometric sample 132 provided by an individual is associated with the base biometric reference template 140 and is included in the base biometric reference template 140 itself, shown as base biometric data 144. In an embodiment, the base biometric data 144 stored within the base biometric reference template 140 is encrypted or protected in some manner, such as signing the entire base biometric reference template 140 containing the base biometric data 144, as discussed further herein below. In an embodiment, the base biometric reference template 140 includes a component "biometric type indicator" (reference numeral 145) that provides an indication of the type of biometric data used to create the base biometric reference template, for example, a fingerprint, iris or retinal scan, etc. In an embodiment, the base biometric reference template 140 that is created using a biometric sample 132 provided by a user is stored in a database 120 within the system 102 along with other base biometric reference templates (referred to as reference numeral 122). In an embodiment, each of the base biometric reference templates 122 stored within database 120 within the computer system 102 is encrypted to protect the identities of the individuals to whom the base biometric reference templates 122 belong.

Further, in an embodiment, each of the base biometric reference templates 122 and each template revocation message is signed with a digital signature before being stored in database 120, and the digital signature(s) (reference numeral 128) are also stored in database 120. In an embodiment, a RSA digital signature scheme is used to sign the base biometric reference template and each template revocation message, such that, the digital signature provides integrity protection over the entire base biometric reference template 140 and each revocation message 155. As such, a digital signature can be used to detect if any of the base biometric reference template information has been tampered with. In particular, the act of digitally signing the entire base biometric reference template cryptographically binds every component within the base biometric reference template together. Further, if a biometric reference template contains any attributes, then such attributes are also cryptographically bound to the base biometric reference template. A template revocation message is created by the revocation engine 115 and the resulting output outputted by the revocation engine 115 is one or more biometric template revocation messages 125, which in an embodiment are stored as biometric template revocation messages 125 in database 120 and which are also injected as biometric template revocation messages 155 into a security token device 150, as explained herein below.

In an embodiment, to form a digital signature on an information object, such as, a biometric reference template or a revocation message, a cryptographic hash (also referred to herein as "encrypted hash" or "hash value" or simply "hash") is computed over the entire object or biometric reference template and then the hash is signed. For example, where a RSA digital signature scheme is used to sign a biometric reference template or a revocation message, a key is used to encrypt the hash to form the digital signature. Furthermore, in an embodiment, the signed biometric reference template is stored along with the digital signature in a database, for example, database 120, and the signed template revocation message(s) along with the digital signature is also stored in database 120. However, the signed biometric reference template and its digital signature and the signed template revocation message and its digital signature may be stored separately within the computer system 100, as shown. Furthermore, the digital signature may be detached from the base biometric reference template (as shown) or may be appended to or associated with the base biometric reference template. Likewise, the digital signature of the template revocation message may be detached from the template revocation message. The use of digital signatures to sign objects to be authenticated is well known in the art and, as such, will not be discussed further herein. It should be understood, however, that although not shown, other hardware and software components (e.g., additional computer systems, routers, firewalls, etc.) could be included in infrastructure 100. Further, in an embodiment, as shown in FIG. 1, a base biometric reference template 140 is used as input for the cancelable biometric transformation engine 116 within the computer system 100. In particular, a base biometric reference template 140 is inputted into the transformation engine 116 and the resulting output outputted by the transformation engine 116 is one or more cancelable biometric reference templates 124, which in an embodiment are stored as cancelable biometric reference templates 124 in database 120 and which are also injected as cancelable biometric reference templates 154 into a security token device 150, as explained herein below.

The revocation engine 115 comprises a data revocation function that uses a revocation algorithm to create a revocation message for base reference template 122 or for cancelable reference template 124. The revocation engine varies the seed values of the revocation function to generate one or more revocation messages for each base reference template 122 or cancelable reference template 124. The revocation function of the revocation engine 115 includes a matrix of revocation key values (also referred to herein as "revocation keys") where a different set of transformation keys is used to create a different revocation message. The one or more revocation messages 125 generated using the revocation engine 115 are injected or stored into a security token device 150 (also referred to herein as "security token" or "token device"), which is issued to a person, or individual or device holder. The security token device 150 is a hardware device that is used to prove an individual or person's identity and serves as an authentication factor (for example, in the in the case of a customer trying to access their bank account). The token device 150 acts like an electronic key to access something, where the token device 150 is used in addition to or in place of a password to prove that the customer is who they claim to be by virtue of possession of the token device. In an embodiment, the unique base biometric reference template identifier 142 contained within the base biometric reference template 140 is used to identify the individual or token device holder. Further, in an embodiment, the token device 150 comprises a secure storage area 152 that securely stores the one or more signed template revocation messages 155 generated by the revocation engine 115. Furthermore, in an embodiment, the token device 150 comprises an application interface 156 for interfacing with an external device 160, such as, a computer or a laptop, etc. The token device could be embedded in a personal or laptop computer, a Personal Digital Assistant (PDA), a mobile telephone or other device, and the device could serve as a standalone security token, implemented as a smartcard, Universal Serial Bus (USB), or software. Similarly, the same base reference template of an individual and the cryptographic keys of the trusted party could be installed on multiple platforms, such as, the personal home computer, wireless device, PDA, and mobile telephone of the individual. Additionally, in an embodiment, the security token device is a cryptographically-capable device that securely stores the private key component of a public-private asymmetric key pair of a trusted party and the hardware, software, and data necessary to create and sign template revocation messages for biometric reference templates and cancelable biometric reference templates.

The transformation engine 116 comprises a data transformation function that uses a transformation algorithm to transform the base biometric data 144 in a base biometric reference template 140 into cancelable biometric data for creating one or more cancelable biometric reference templates 124. The transformation engine 116 varies the seed values (transformation keys) of the transformation function to generate one or more cancelable biometric reference templates from the base biometric data in a base biometric reference template. In an embodiment, the data transformation function of the transformation engine 116 includes a matrix of function key values (also referred to herein as "transform keys", "transformation keys" or "transform values" or "key values"), where a different set of transformation keys is used to create a different cancelable biometric reference template. The one or more cancelable biometric reference templates 124 generated using the transformation engine 116 are injected or stored into a security token device 150 (also referred to herein as "security token" or "token device"), which is issued to a person, or individual or device holder. As such, a device holder of the token device (namely, the individual or person matching the base biometric reference template 140 and the one or more cancelable biometric reference templates 154) can dispense the cancelable biometric reference templates 154, as needed. The security token device 150 is a hardware device that is used to prove an individual or person's identity and serves as an authentication factor (for example, in the case of a customer trying to access their bank account). The token device 150 acts like an electronic key to access something, where the token device 150 is used in addition to or in place of a password to prove that the customer is who they claim to be by virtue of possession of the token device. In an embodiment, the unique base biometric reference template identifier 142 contained within the base biometric reference template 140 is used to identify the individual or token device holder. Further, in an embodiment, the token device 150 comprises a secure storage area 152 that securely stores the one or more cancelable biometric reference templates 154 generated by the transformation engine 116. Furthermore, in an embodiment, the token device 150 comprises an application interface 156 for interfacing with an external device 160, such as, a computer or a laptop, etc. The token device could be embedded in a laptop computer, a Personal Digital Assistant (PDA), a mobile telephone or other device, and the device could serve as a standalone security token, implemented as a smartcard, Universal Serial Bus (USB), or software. Similarly, the same base reference template of an individual and the cryptographic keys of the trusted party could be installed on multiple platforms, such as, the personal home computer, wireless device, PDA, and mobile telephone of the individual. Additionally, in an embodiment, the security token device is a cryptographically-capable device that securely stores the private key component of a public-private asymmetric key pair of a trusted party and the hardware, software, and data necessary to create and sign new biometric reference templates that are derivatives of the base reference template, and that contain cancelable biometric data.

Figure 2:
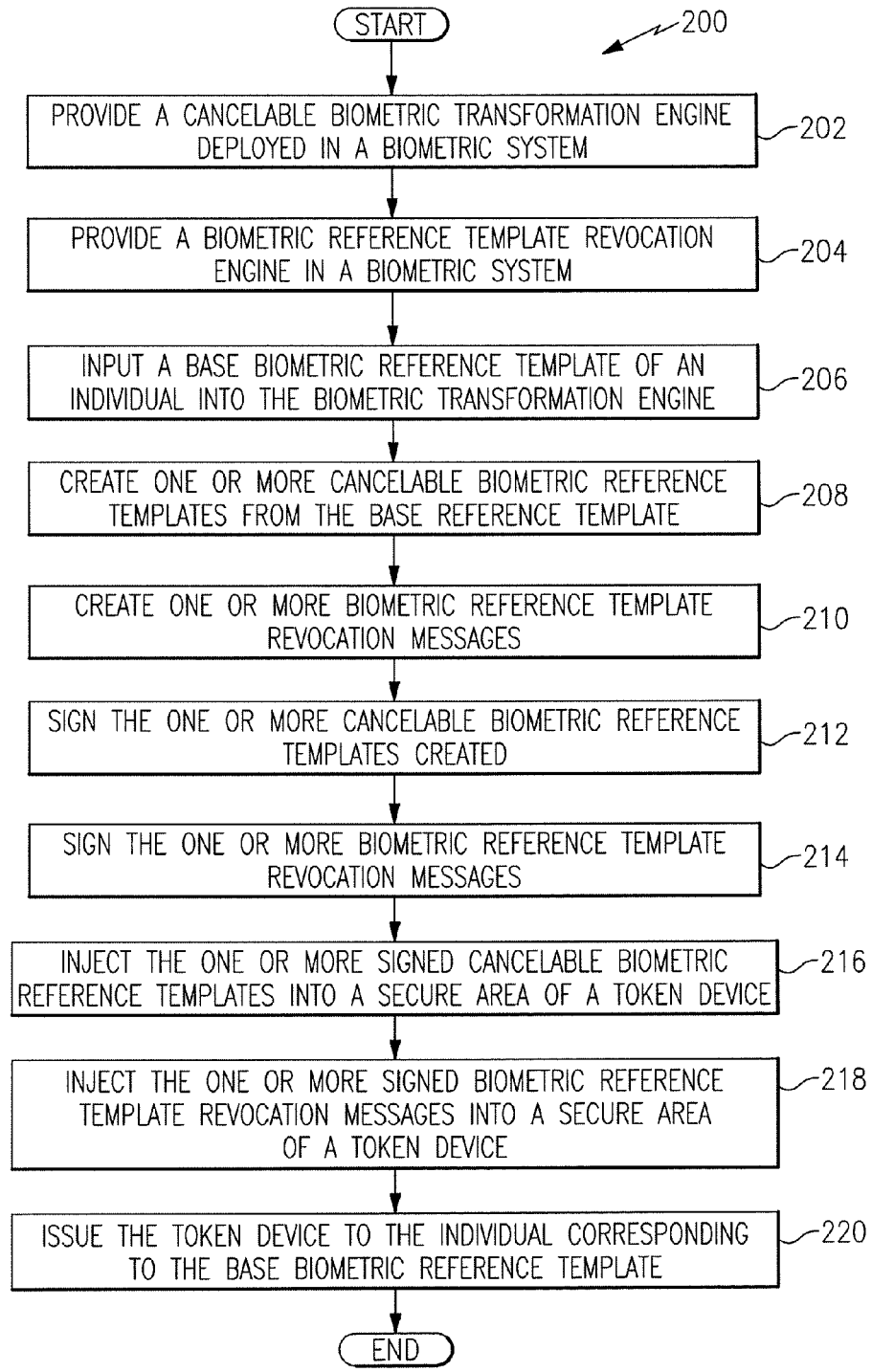
FIG. 2 depicts a flowchart outlining the steps for dispensing a biometric reference template revocation message to a user or individual, in response to a request from the user.

Reference is made to FIG. 2, which outlines the steps for generating a biometric reference template revocation message on demand, that is, upon request of a user or individual using a personal biometric reference template revocation device. Turning to FIG. 2, reference numeral 200 depicts a flowchart outlining the steps for dispensing a biometric reference template revocation message on demand to a user or individual, in response to a request from the user or individual, using one embodiment of a personal biometric reference template revocation device, in accordance with an embodiment of the present invention. Referring to FIG. 2, the process begins with a biometric service provider providing, in step 202, a cancelable biometric transformation engine that is deployed on a device, such as, a computer system, computer chip, cryptographic module or computer code within a computer system that is capable of performing the transformation. In step 204, a biometric service provider provides a biometric reference template revocation engine that is deployed on the device, e.g., a computer system, computer chip, cryptographic module or computer code within a computer system that is capable of performing the revocation protocol, including generating and possibly signing revocation messages. In step 206, a base biometric reference template created using a biometric sample collected from an individual is inputted into the transformation engine. The transformation engine applies a transformation or transform function having a specific transform key value set to create a cancelable biometric reference template in step 208. Further, multiple cancelable biometric reference templates can be created in step 208 by varying the key values of the transform function in the transformation engine. In step 210, a revocation engine located in the computer system creates a biometric reference template revocation message. Further, multiple biometric reference template revocation messages can be created in step 210 for each biometric reference template or cancelable biometric reference template by varying the key values of the revocation function in the revocation engine.

The one or more cancelable biometric reference templates created are signed in step 212 using digital signatures and the one or more biometric reference template revocation messages are signed in step 214 using digital signatures. Digital signatures may, for example, be in the form of a cryptographic message syntax (CMS) signature, a Security Assertion Markup Language (SAML) signature, or an Extended Markup Language (XML) Access Control Markup Language (XACML) signature. Further, the one or more signed cancelable biometric reference templates is injected, in step 216, into a security token device that is to be distributed to an individual or user whose base biometric reference template is used to create the cancelable biometric reference templates. In step 218, the one or more signed biometric reference template revocation messages is injected into a security token device that is to be distributed to an individual or user requesting a message to revoke a base biometric reference template or cancelable biometric reference templates. It should be mentioned that the signatures could be generated from a biometric service provider as a private key component of a public-private key pair or as a public key certificate of the token device holder. In step 220, the security token device is issued to the individual or user (device holder), such that, the individual can dispense a cancelable biometric reference template from the one or more cancelable biometric reference templates stored onto the security token device to an entity, as needed. Additionally, in step 220, the individual can dispense a biometric reference template revocation message stored onto the security token device to an entity, as needed, ending the process.

Figure 3:
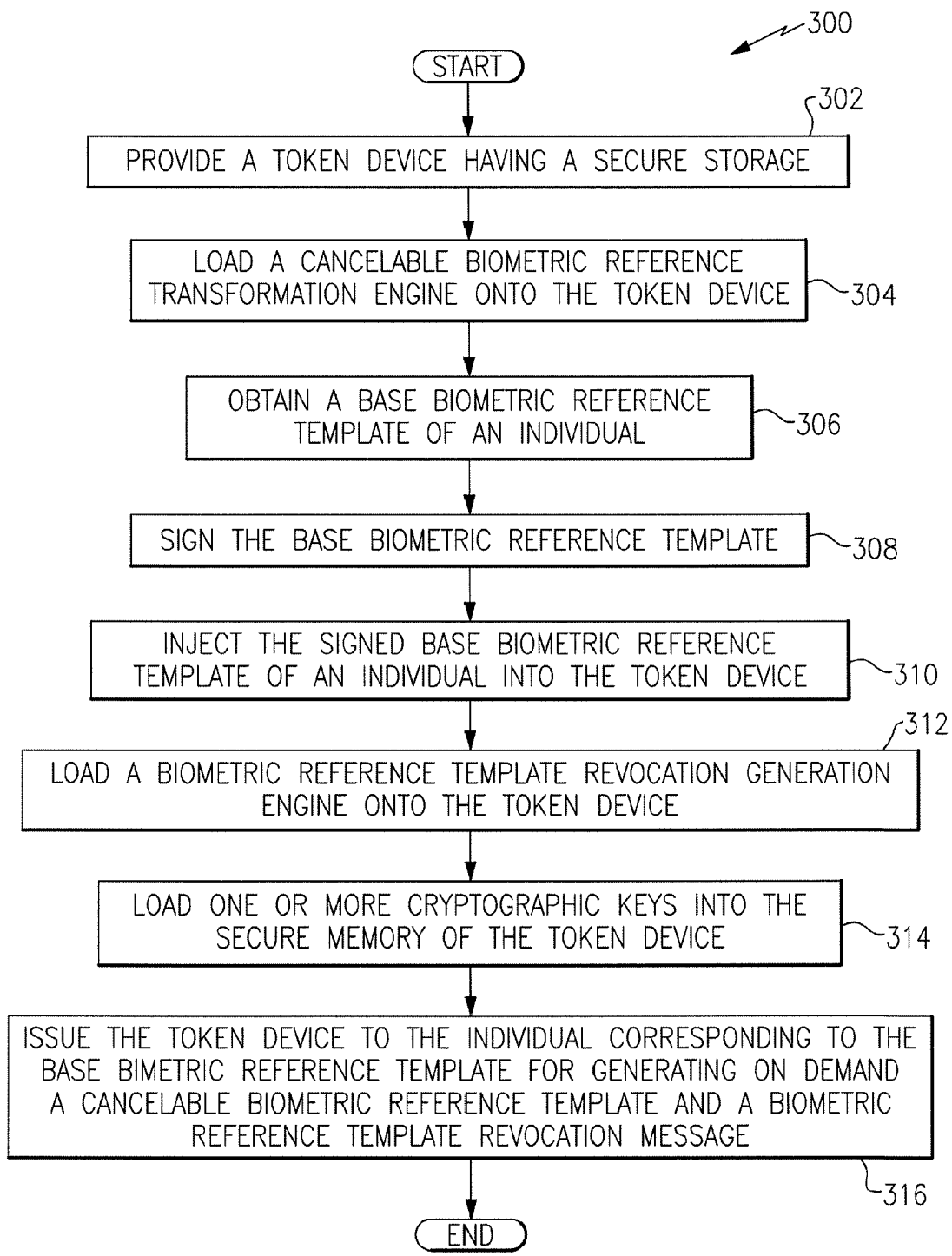
FIG. 3 depicts a flowchart outlining the steps for generating a biometric reference template revocation message on demand to a user or individual, in response to a request from the user.

Reference is now made to FIG. 3, which depicts a flowchart 300 outlining the steps for generating a biometric reference template revocation message on demand to a user or individual, in response to a request from the user or individual, using another embodiment of a personal biometric reference template revocation device. Flowchart 300 further includes the steps for generating a cancelable or revocable or derivative biometric reference template on demand to a user or individual, in response to a request from the user or individual, using another embodiment of a personal cancelable biometric reference template generation device.

The process begins with a biometric service provider providing in step 302 a security token device that is to be distributed to an individual or user (device holder) for generating a cancelable biometric reference template to an entity, as needed. A cancelable biometric reference template transformation engine is loaded onto the token device in step 304. The biometric service provider obtains or accesses in step 306 a base biometric reference template of the individual to whom the token device is to be issued. The biometric service provider signs the base biometric reference template in step 308 and in step 310 the biometric service provider injects the signed base biometric reference template of the individual into the token device. In step 312, a biometric reference template revocation generation engine is loaded onto the token device. One or more cryptographic keys are loaded into the secure memory of the token device in step 314. Examples of cryptographic keys include, but are not limited to, biometric service provider-generated private key component of a public-private key pair or a public key certificate of the token device holder. The biometric service provider issues the token device to the individual corresponding to the base biometric reference template for generating a cancelable biometric reference template on demand, and for generating a biometric reference template revocation message on demand, ending the process.

Figure 4:
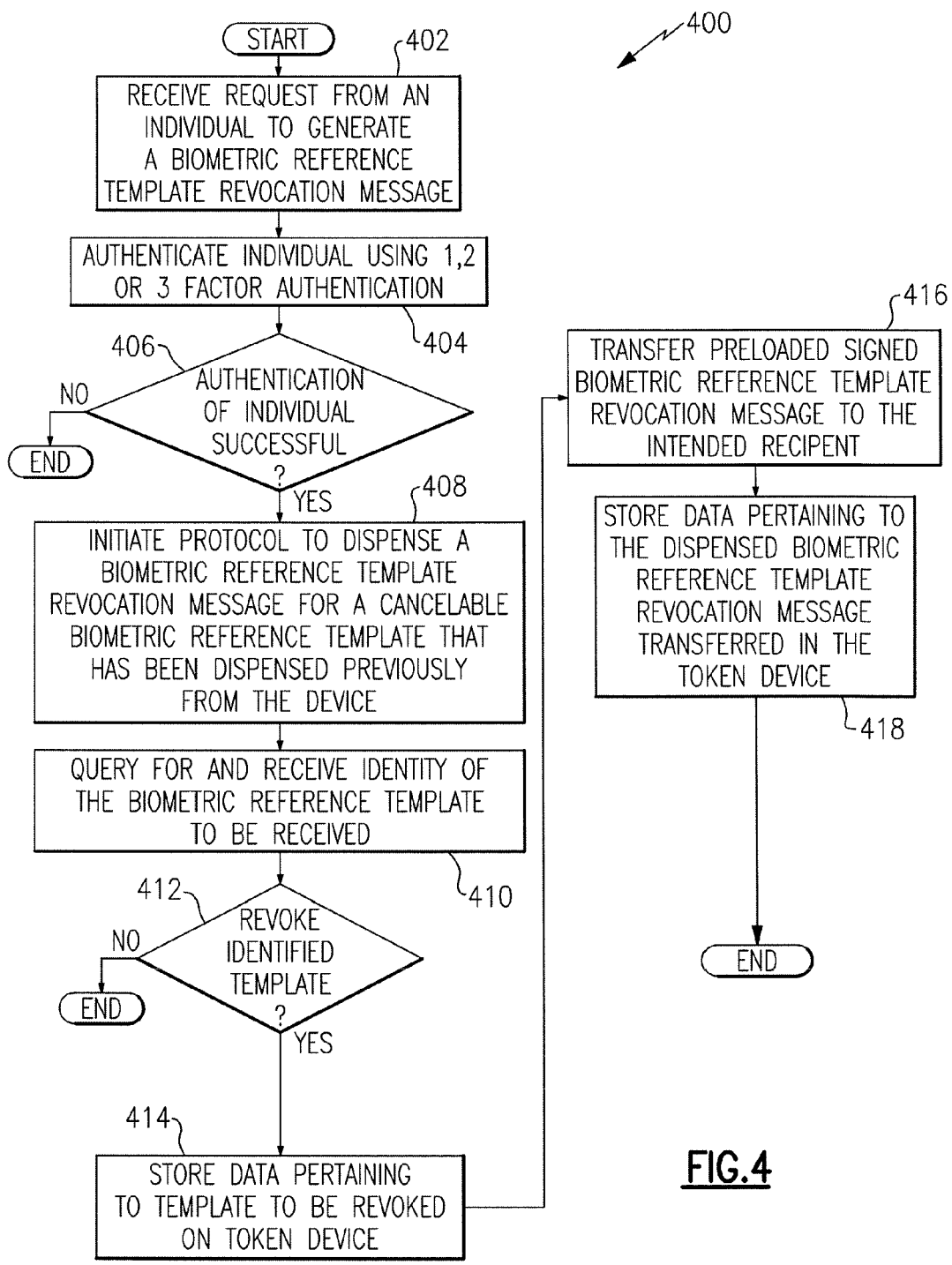
FIG. 4 depicts a flowchart outlining the steps for issuing to an entity a biometric reference template revocation message, in response to a request from a user or individual.

Turning to FIG. 4, reference numeral 400, depicts a flowchart outlining the steps for generating to an entity or intended recipient a biometric reference template revocation message for a biometric reference template or cancelable biometric reference template belonging to an individual. The template revocation message generation device is a security token device that is issued to the individual. The process begins at step 402 with a biometric application within a computer system receiving a request from an individual or device holder of the security token device to generate for an intended recipient a biometric reference template revocation message for cancelable biometric reference templates stored onto the security token device. For example, the individual may want to access an account at a bank and, thus, want to issue a biometric reference template revocation message to the bank. In step 404, the individual or device holder is authenticated. In an embodiment, the token device is configured to use either a one, two or three factor authentication process for authenticating the individual. In particular, in a one-factor authentication, the individual may have to provide a password or a pin for authentication purposes, whereas, in a two-factor authentication, the individual may have to prove possession of the security token device along with the password or a pin for authentication purposes. Further, in a three-factor authentication, the individual may have to prove possession by providing the security token device, a password or a pin along with a biometric sample of the individual for authentication purposes. In step 406, a determination is made as to whether or not the authentication of the individual was successful. If the authentication is not successful, that is, the authentication fails, then the process ends. However, if the authentication is successful, then the token device initiates in step 408 a protocol to dispense a biometric reference template revocation message that is stored onto the token device. In step 410, the biometric application queries for and receives the identity of biometric reference template to be revoked. Further, in step 412, a determination is made as to whether or not to revoke the identified template. If it is determined that the identified template should not be revoked, then the process ends. However, if it is determined that the identified template should be revoked, the biometric application stores data pertaining to the template to be revoked onto the token device in step 414. The biometric application dispenses by transferring in step 416 the biometric reference template revocation message allocated to the intended recipient. Further, the biometric application stores data pertaining to the dispensed biometric reference template revocation message transferred to the intended recipient onto the token device in step 418 and the process ends.

Figure 5:
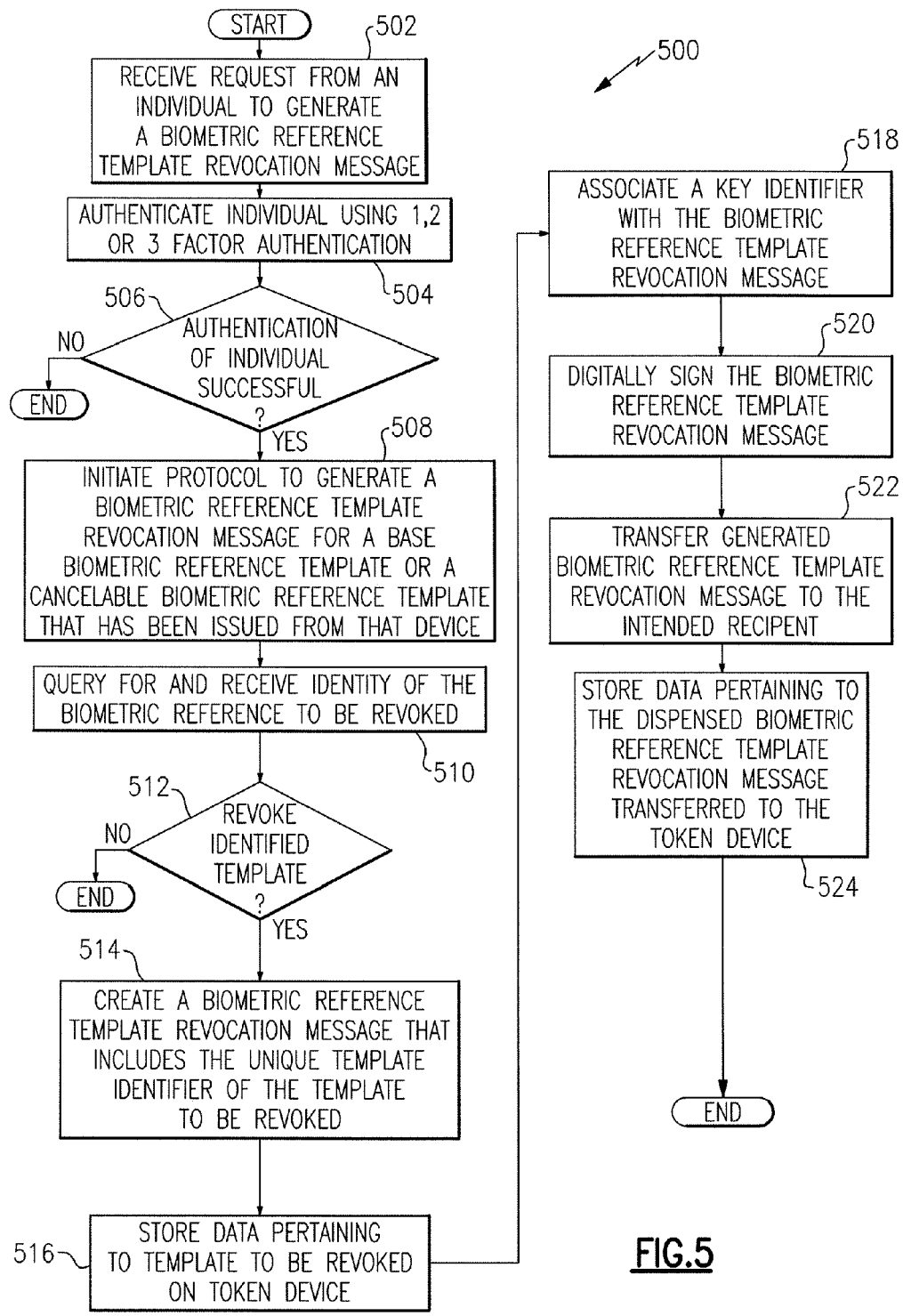
FIG. 5 depicts a flowchart outlining the steps for issuing to an entity a biometric reference template revocation message, in response to a request from a user or individual.

Turning to FIG. 5, reference numeral 700, depicts a flowchart outlining the steps for generating a biometric reference template revocation message for issuing to an entity or intended recipient, in response to a request from a user or individual. In an embodiment, the revocation message generation device is a security token device that is issued to the individual. The process begins at step 502 with a biometric application within a computer system receiving a request from an individual or device holder of the security token device to generate and dispense a biometric reference template revocation message for issuing to an intended recipient, using a revocation engine loaded onto the security token device, which generates a revocation message for a base biometric reference template or cancelable biometric reference template belonging to an individual. In step 504, the individual or device holder is authenticated. In an embodiment, the token device is configured to use either a one, two or three factor authentication process for authenticating the individual. In particular, in a one-factor authentication, the individual may have to provide a password or a pin for authentication purposes, whereas, in a two-factor authentication, the individual may have to prove possession of the security token device along with the password or a pin for authentication purposes. Further, in a three-factor authentication, the individual may have to provide the security token device, a password or a pin along with a biometric sample of the individual for authentication purposes. In step 506, a determination is made as to whether or not the authentication of the individual was successful. If the authentication is not successful, that is, the authentication fails, then the process ends. However, if the authentication is successful, then the token device initiates in step 508 a protocol to generate a biometric reference template revocation message using the revocation engine loaded onto the token device. In step 510, the biometric application queries for and receives identity of the biometric reference template to be revoked. Further, in step 512, a determination is made as to whether or not the identified biometric reference template is to be revoked. If it is determined that the identified biometric reference template is not to be revoked, then the process ends. However, if it is determined that the identified biometric reference template is to be revoked, then a biometric reference template revocation message is created in step 514, which message includes the unique template identifier of the template to be revoked. Further, the biometric application stores data pertaining to the template to be revoked onto the token device in step 516. The biometric application associates, in step 518, a key identifier with the biometric reference template revocation message. In step 520, the biometric reference template revocation message is digitally signed. The biometric application transfers, in step 522, the generated biometric reference template revocation message allocated to the intended recipient. Further, the biometric application stores data pertaining to the generated biometric reference template revocation message transferred to the intended recipient onto the token device in step 524, and the process ends.

Accordingly, the invention provides a system, method and a program product for generating a biometric reference template revocation message on demand, in response to a request from a user or individual. The invention provides the ability to generate and dispense, as needed, one or more biometric reference template revocation messages for a base biometric reference template or a cancelable or revocable biometric reference template. Each template revocation message instructs a biometric service provider to blacklist one or more base or cancelable biometric reference templates, which templates can be identified in a revocation message by their unique template identifiers. In this way, an individual has greater control over who is allowed to use their biometric information, and is also able to undo the effects of dispensing a cancelable biometric reference template. Confirmation of a successful revocation or other status information can be communicated by the biometric service provider to the individual requesting the template revocation at the time revocation is requested, or at a later time. These communications can be in direct response to a revocation request or through an out of band communication. Optionally, an electronic mail address can be used to allow an individual to manage all steps of the revocation process from a laptop computer.

The foregoing descriptions of specific embodiments of the present invention have been presented for the purpose of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for revoking a biometric reference template generated for an individual by a biometric service provider, the method comprising the steps of:
generating, using a biometric reference template revocation engine, at least one biometric reference template revocation message;
injecting the at least one biometric reference template revocation message created into a secure portable device issued to the individual;
storing said at least one biometric reference template revocation message in the secure portable device;
loading the biometric reference template revocation engine onto the secure portable device for generating on demand of the individual the biometric reference template revocation message, wherein the secure portable device concurrently stores said at least one biometric reference template revocation message and said loaded biometric reference template revocation engine; and
sending the generated biometric reference template revocation message to the biometric service provider to revoke the biometric reference template such that the biometric service provider no longer possesses a valid biometric reference template for the individual.

2. The method of claim 1, wherein the injecting step further comprises the step of:
signing the biometric reference template revocation message to provide a signature thereon before injecting the biometric reference template revocation message into the secure portable device.

3. The method of claim 1, wherein the injecting step further comprises the step of:
encrypting the signature on the biometric reference template revocation message before injecting the biometric reference template revocation message into the secure portable device.

4. The method of claim 3, wherein the generating step further comprises the step of:
requesting input of one or more authentication factors for generating the biometric reference template revocation message for the individual.

5. The method of claim 4, further comprising the step of:
storing the biometric reference template revocation message in a database.

6. The method of claim 5 wherein the biometric reference template comprises an ordinary biometric reference template or a cancelable biometric reference template.

7. A system for revoking a biometric reference template generated for an individual by a biometric service provider, the system comprising:
- a biometric reference template revocation engine for generating one or more biometric reference template revocation messages for a biometric reference template; and
- a secure portable device assigned to the individual and adapted to concurrently store the one or more generated biometric reference template revocation messages and an instance of the biometric reference template revocation engine, wherein the biometric reference template revocation engine is further adapted to generate the biometric reference template revocation message on demand, and further wherein the biometric reference template revocation engine is adapted to send the generated biometric reference template revocation message to the biometric service provider to revoke the biometric reference template such that the biometric service provider no longer possesses a valid biometric reference template for the individual.

8. The system of claim 7, further comprising:
- an authentication tool for authenticating identity of the individual seeking to generate a biometric reference template revocation message.

9. The system of claim 8, further comprising:
- a database for storing the biometric reference template revocation message.

10. The system of claim 7, further comprising:
- a biometric application for assigning a respective identifier to a respective biometric reference template for uniquely identifying the respective biometric reference template to be revoked.

11. The system of claim 10, wherein the one or more of the biometric reference template revocation messages are signed before being stored.

12. The system of claim 11, wherein the biometric application tracks an identity of an intended recipient for receiving the biometric reference template revocation messages.

13. A computer program product for revoking a biometric reference template generated for an individual by a biometric service provider, the computer program product stored on a non-transitory computer readable storage medium and comprising:
- first program instructions to generate, utilizing a biometric reference template revocation engine, at least one biometric reference template revocation message;
- second program instructions to inject the at least one biometric reference template revocation message created into a secure portable device;
- third program instructions to store said at least one biometric reference template revocation message in the secure portable device;
- fourth program instructions to load the biometric reference template revocation engine onto the secure portable device for generating on demand of the individual the biometric reference template revocation message, wherein the secure portable device concurrently stores said at least one biometric reference template revocation message and said loaded biometric reference template revocation engine; and
- fifth program instructions for sending the generated biometric reference template revocation message to the biometric service provider to revoke the biometric reference template such that the biometric service provider no longer possesses a valid biometric reference template for the individual.

14. The computer program product of claim 13, further comprising:
- sixth program instructions to store the at least one biometric reference template revocation message in a database, wherein the sixth program instructions are recorded on the computer readable storage medium.

15. The computer program product of claim 13, wherein the program instructions further comprise instructions to sign the at least one biometric reference template revocation message before injecting the at least one biometric reference template revocation message into the secure portable device.

16. The computer program product of claim 15 wherein the first program instructions further comprise instructions to encrypt the signature on the at least one biometric reference template revocation message before injecting the at least one biometric reference template revocation message into the secure portable device.

17. The computer program product of claim 16 wherein the program instructions further comprise instructions to request input of one or more authentication factors for generating the biometric reference template revocation message for the individual.

* * * * *